Oct. 6, 1953  R. B. DAVIS  2,654,252
MULTIPLE MEASURING SPOON
Filed Jan. 10, 1949
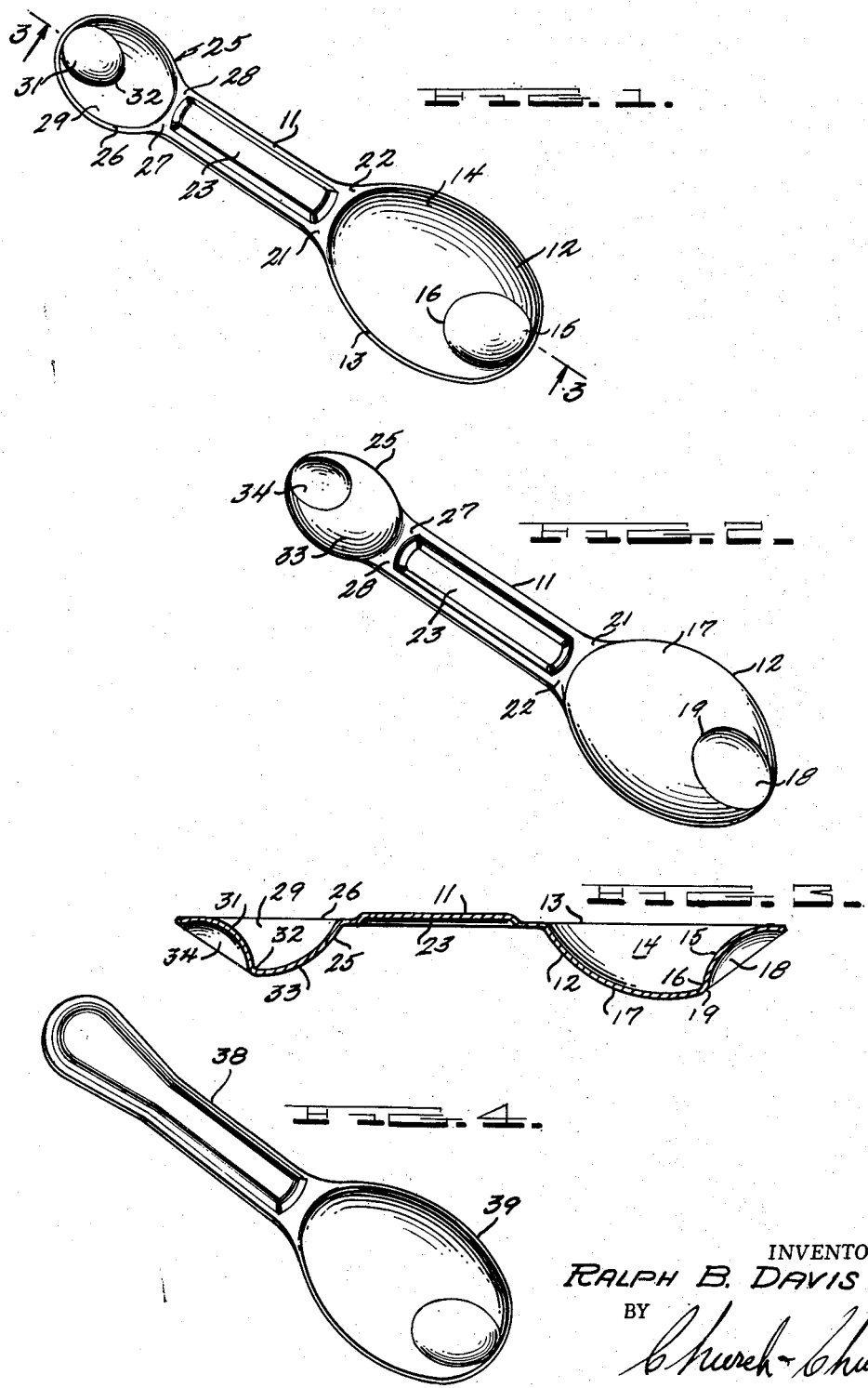
INVENTOR.
RALPH B. DAVIS
BY
Church & Church
ATTORNEYS Patented Oct. 6, 1953

2,654,252

UNITED STATES PATENT OFFICE 2,654,252

MULTIPLE MEASURING SPOON

Ralph B. Davis, Prestonsburg, Ky.

Application January 10, 1949, Serial No. 70,100

1 Claim. (Cl. 73—426)

This invention relates to multiple measuring spoons and particularly concerns a single spoon having provision for two or four different measurements.

In domestic cooking, four measurements customarily used are volumes of one tablespoon, one teaspoon, one-half of a teaspoon and one-fourth of a teaspoon. Usually four separate spoons are used for these measurements and in some cases the four separate spoons have been secured as by a ring. Also, there have been developed some measuring spoons of a unitary structure which have separate measuring parts formed into a single instrument as, for example, a spoon having two measuring bowls, one at each end of its shank. Also, some measuring spoons have been cup-shaped and placed back to back with a common handle. All of these devices have proven awkward to use and difficult to clean.

A major object of the present invention is to provide a unitary spoon structure with four measuring compartments each of which may be used with equal facility and all of which may be easily cleaned.

More particularly, an object of this invention is to provide a multiple measuring spoon in which a single spoon has two sides of different volumes, the bowls on both sides terminating in a single rim. Specifically, an object of the invention is to provide a pair of two-sided measuring spoon bowls, one at each end of a handle to afford the four customary spoon and fractional spoon measurements, all of which merge in a portion of the periphery of a spool bowl.

In accordance with these objects, an important feature of the invention resides in the shape of a spoon bowl having a concave surface on one side and a concave depression on the other with a portion of the periphery of the depression being coincident with a portion of the periphery of the concave surface. A pair of these two-sided bowls, one at each end of a shank, may have one concave surface with a volume of one tablespoon and a concave depression on the other side thereof with a volume of one-half of a teaspoon; and may have another concave surface with a volume of one teaspoon and a concave depression on the opposite side thereof with a volume of one-fourth of a teaspoon, all having a lip opposite the handle for access to material in a container.

Other objects and advantages of the invention will become apparent from the following specification taken with the accompanying drawings wherein:

Figure 1 is a perspective view of a multiple measuring spoon embodying the invention in its preferred form;

Fig. 2 is a perspective view of the opposite side of the multiple measuring spoon shown in Figure 1;

Fig. 3 is a longitudinal section taken on the line 3—3 of the multiple measuring spoon shown in Fig. 1; and Fig. 4 is a perspective view of a modified form of the measuring spoon embodying the invention.

In accordance with the preferred form of the invention, the multiple measuring spoon has a shank with one end integrally formed with a rim of a two-sided spoon bowl, one side of which has a concave surface extending from the rim in the shape of a spoon bowl except for a convex protuberance adjacent the rim diametrically opposite the same. Flared welding extending from the shank to the periphery of the rim reinforces the connection of the bowl to the shank and a reinforcing ridge along the shank prevents bending thereof. At the other end of the shank a second two-sided spoon bowl has its rim integrally formed with the shank and provided with reinforced webs flaring from the shank to the periphery of the rim. A concave surface extending from the rim, preferably in the same direction as the concave surface of the other spoon bowl, has a protuberance adjacent the rim diametrically opposite the shank. Both rims are circularly shaped and the intersections of both protuberances with the concave surfaces are circularly shaped. The opposite sides of both two-sided spoon bowls have convex surfaces extending from their rims corresponding to the concave surfaces thereof. These opposite sides of the two-sided spoon bowls have concave depressions corresponding to the convex protuberances.

For a more particular description of the invention reference may be had to the drawings where a multiple measuring spoon has a shank 11. At one end of the shank is a first two-sided spoon bowl 12 having a circularly shaped rim 13 preferably formed integrally with the shank 11. As seen in Fig. 1, this two-sided spoon bowl 12 has a concave surface 14 generally of a spoon bowl shape extending from the rim 13. Formed in this concave surface 14, adjacent the rim 13 opposite the shank 11 is a convex protuberance 15 generally having the shape of a spherical segment. Intersection 16 of the protuberance 15 and the concave surface 14 is of substantially circular shape.

As seen in Fig. 2, the other side of the two-sided spoon bowl 12 has a convex surface 17 extending from the rim 13 and generally having the shape of the back of a spoon bowl. Adjacent the rim 13 opposite shank 11 the surface 17 is formed with a concave depression 18 corresponding to the convex protuberance 15. The concave depression 18 is also generally the shape of a spherical segment so its intersection 19 with convex surface 17 is substantially circular.

Extending from opposite sides of the shank 11 to the periphery of rim 13 are webs 21 and 22 reinforcing the connection of the two-sided spoon bowl to the shank 11. The shank itself is preferably reinforced by a ridge 23 extending longitudinally along the shank.

At the other end of the shank is a second two-sided spoon bowl 25 having its rim 26 preferably formed integrally with the shank. Reinforcing webs 27 and 28 may flare outwardly from the other end of the shank 11 to the periphery of the rim 26.

As seen in Fig. 1, two-sided spoon bowl 25 has a concave surface 29 extending from the rim 26. Adjacent the rim 26 opposite the shank 11, concave surface 29 is formed with a convex protuberance 31 having the general shape of a spherical segment so its intersection 32 with concave surface 29 is substantially circular.

The other side of the two-sided spoon bowl 25 has a convex surface 33 extending from the rim 26. Adjacent the rim 26 and opposite shank 11 convex surface 33 is formed with a concave depression 34 also of spherical segmental shape corresponding to convex protuberance 31.

The size of double-sided spoon bowl 12 is so chosen that its concave surface 14 has a volume of one tablespoon to the rim 13. This volume is compensated for the space occupied by protuberance 15. Concave depression 18 on the opposite side of the two-sided spoon has a volume of one-half of a teaspoon. Hence, the concave surface 14 may have a volume of about one tablespoon plus one-half of a teaspoon if the protuberance 15 were smoothed out. With the protuberance 15 as shown in the drawing, the concave surface 14 has an accurate volume of one tablespoon.

At the other end of the spoon concave depression 34 preferably has a volume of one-fourth of a teaspoon. With compensation made for protuberance 31, concave surface 29 has a volume of one teaspoon to the rim 26. Thus, the concave surface 29 would otherwise have a volume of one and one-fourth of a teaspoon.

With the arrangement described a pair of two-sided spoon bowls provide the four customary spoon measurements, namely, one tablespoon, one teaspoon, one-half of a teaspoon and one-fourth of a teaspoon. Each of the measuring compartments is readily accessible. Regardless of which one is being used, it has a convenient handle. With the arrangement of the smaller compartment coincident with the rim of the larger compartment and opposite the handle, either the larger or the smaller side of the double-sided spoon bowl may engage the side and bottom of a container to remove the measured quantity of its contents. The rounded surfaces of each of the measuring cavities permits quick and easy cleaning of the entire instrument.

One incidental advantage of this measuring spoon, particularly in using the two smaller cavities formed by the concave depressions 18 and 34, is the ease with which the material may be leveled off as it is removed from the container. As the sides of the two depressions are rounded and the shank is angularly disposed with respect to the exposed edges of these depressions, either of them may be drawn along the side of a container as the spoon is removed to level off either one-fourth of a teaspoon or one-half of a teaspoon of the material in the container.

While the present invention has found its greatest use in a multiple measuring spoon having a pair of two-sided spoon bowls, in some instances it may be useful with only a single two-sided spoon bowl. As illustrated in Fig. 4, a shank 38 may have one end formed integrally with a two-sided spoon bowl 39 having the characteristics of either the two-sided spoon bowl 12 or the two-sided spoon bowl 25.

In addition to its many advantages in use as multiple measuring spoon, the spoon of the present invention has the further advantage of being economically manufactured. The entire spoon may be made in a single stamping operation. By using sheet metal such as aluminum for example, a complete multiple measuring spoon can be stamped in a single operation. Thus, a metal multiple measuring spoon may be produced according to the present invention as cheaply as, if not cheaper than, the conventional set of four individual spoons on a ring. The entire spoon is preferably made of uniform thickness. That is, the shank has the same thickness as each of the two-sided spoon bowls. The thickness of the spoon bowl between concave surface 14 and convex surface 17 is the same as the thickness between convex protruding surface 15 and concave depressed surface 18.

What is claimed is:

A measuring spoon comprising a shank having at one end a spoon bowl of substantially uniform thickness having a circularly shaped rim. one side of said spoon bowl having a concave surface extending from said rim with a convex protuberance thereon having a portion of its periphery coincident with said rim diametrically opposite said shank so the intersection of said protuberance with said surface at said coincident portion merges with said rim, said protuberance having a circular edge in a plane forming an acute angle with a plane including the rim of the spoon bowl whereby the edge of the protuberance may be drawn along the side of a container, said one side of the bowl having a predetermined volume to said rim, said protuberance having a predetermined fraction of said predetermined volume.

RALPH B. DAVIS.

References Cited in the file of this patent

UNITED STATES PATENTS

| Number | Name | Date |
|---|---|---|
| D. 12,770 | Lyman | Feb. 14, 1882 |
| D. 92,118 | Stuart | Apr. 24, 1934 |
| D. 156,850 | Shirley | Jan. 10, 1950 |
| 265,390 | Cosbey | Oct. 3, 1882 |
| 2,259,504 | Wilson | Oct. 21, 1941 |

FOREIGN PATENTS

| Number | Country | Date |
|---|---|---|
| 329,708 | Italy | Sept. 18, 1935 |